May 16, 1944. R. L. KAYE Re. 22,481

BUILDING UNIT

Original Filed March 31, 1939

INVENTOR.
ROBERT LEE KAYE
BY H F Woodward
ATTORNEY

Reissued May 16, 1944

Re. 22,481

UNITED STATES PATENT OFFICE 22,481

BUILDING UNIT

Robert Lee Kaye, Newark, N. J., assignor to Briktex, Incorporated, Newark, N. J.

Original No. 2,224,351, dated December 10, 1940, Serial No. 265,192, March 31, 1939. Application for reissue April 23, 1941, Serial No. 389,897

10 Claims. (Cl. 20—5)

The invention relates to materials to be used in the construction of houses or other buildings as weatherproof fiber board siding to take the place of wooden siding and weatherboarding for the outer wall covering for houses or buildings. The material also may be used as a veneering for walls of buildings where it is desired to simulate brick, tile or other selected finish of a highly diversified character.

It is accordingly the object of my invention to provide a material suitable for construction of walls made of fiber board, paper board, etc. which is formed with additional material and provided with a finish or outer layer or coating of material which makes it available as an outside wall construction material.

A further object of the invention is to provide a new process of manufacturing building covering units of the type hereafter to be described, wherein by the steps taken the units are reinforced so that they will withstand hard abuse and be more rigid when applied than ordinary siding units.

Other objects and advantages will be more apparent from the following description wherein reference is to be had to the accompanying drawing, upon which Figure 1 is an elevational view showing the face of the unit.

Some of the features of the invention include the reinforcing elements, the arrangement of the units to form a wall covering, their proportionate lengths in relation to the spacing between distance of the studding; the staggered relations of the vertical joints of a contiguous horizontal row, and generally, all details of the construction of the units.

Figure 1:
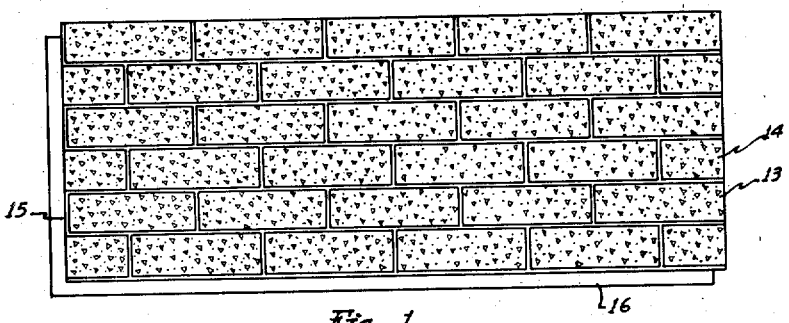
Figure 2:
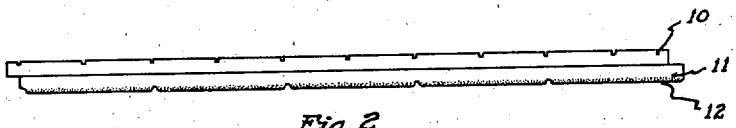
Figure 2 is a view of the edge of the unit shown in Figure 1.
Figure 3:
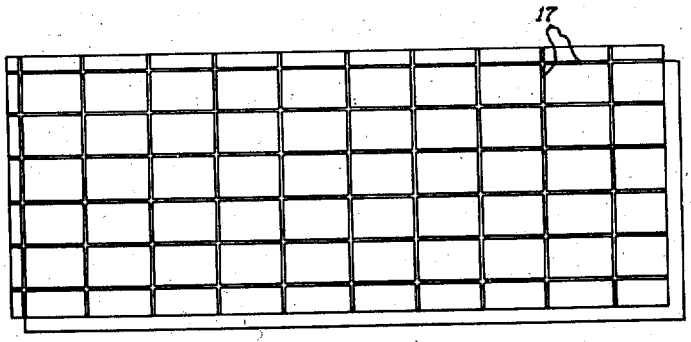
Figure 3 is an elevational view of the back of the unit shown in Figure 1.
Figure 4:
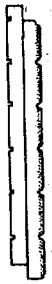
Figure 4 is a view of the end of the unit shown in Figure 1.

The length of the units shown in Figures 1 and 3 are ordinarily about 48½" and the width is ordinarily about 15½". Each unit in this instance engages four studs, the distance between the studs being about 16". The long dimension of the slab is transverse to the studding and the end overlapping or abutment of contiguous slabs of the horizontal rows, preferably takes place on the studding.

A fiber or other type board 10 is preferably dried to remove all of the moisture or render the board substantially bone dry at about 400° F. The hot dry board is then surface impregnated with hot waterproofing compound such as asphalt, tar, wax, and the like. After the surface of the board has been surface impregnated or coated as by spraying with hot asphalt or the like, the excess impregnating or coating compound may be removed by mechanical means such as squeeze rolls or scrapers. It is not absolutely essential that the excess waterproofing compound be removed by mechanical means.

The coated or impregnated board is dried or baked in a high temperature oven at about 350 to 450° F. When the baking operation is complete the board containing considerable heat and the impregnated or coated fibers are soft and pliable. While the unit is in this condition, it is passed between one or more pair of calendering rolls. The calendering rolls burnish or smooth the surface waterproofing compound and fibers thus sealing the back surface and giving such surface a vapor proof finish. The finish is generally smooth and glossy and may be termed a vapor barrier.

The board while still hot is passed through what is termed an impress roll having thereon the design shown in Figure 3. There is formed on the back of the board imprint lines 17 which preferably are about $\frac{1}{32}$ of an inch in depth. The action of the impress roll is to drive the waterproofing compound deeper into the board along the lines 17 which forms a series of inverted beads. These beads give added strength and rigidity to the board, and furnish the applying mechanic with guide lines for cutting or dividing the unit on the job. The lines 17 are preferably aligned with the mortar joints or bars 15 on the face of the units and the waterproofing compound, penetrating to a greater depth than normal as mentioned above, extends inward a substantially greater distance than at those portions which are not impressed. Too deep scoring may overcome the stiffening and fiber cementing action of the waterproofing compound and actually weaken the board. Too deep scoring should therefore be avoided so that the advantage of a stronger board is not lost.

The board 10 now has applied a suitable mastic 11 to one surface. While the mastic is hot, granular material 12 is spread over the surface thereof. The granules are now pressed into the mastic material. The unit is now passed to a suitable embossing roll where brick simulating elements or the like is formed. Between each element 13 and 14 are formed mortar simulating lines 15.

These mortar simulating lines 15 are normally used as nailing strips since it is one of the main purposes of the entire structure to give the appearance of masonry and a nail head in the middle of a brick would spoil the effect.

Such normal use of the mortar joints may be seen in Patent No. 1,886,363 granted November 8, 1932, to Aufderheide and Patent No. 2,226,265 filed July 7, 1936, by Sullivan et al. which are deemed to be representative of the general practice in this respect at the time filing of the original application on which the present reissue application is based.

The board 10 may be shiplapped as at 16 so that tight joints are provided with adjacent units. These units may be secured directly to the studding or may be used as a veneering for walls and the like. In either instance the units are preferably secured in place by suitable fastening means such as nails. The fastening means pass through the unit preferably at the mortar joints 15, and into the studding.

As mentioned above the beadings 17 give added strength and rigidity to the board by driving the waterproofing compound deeper. The compound cements the fibers together and also stiffens the individual fibers themselves. The added strength greatly increases the gripping action of the fibers on the nail or other fastening means driven into the board. The mortar joints 15 serve as quick and ready guide means indicating the best nailing areas of the board.

In the preferred size the units are 48½" long and 15½" wide, this gives a covering surface of 48" by 15" as ½" shiplap is preferably employed.

What I claim is:

1. A building unit comprising a fiber board adapted to be secured to a building wall, weatherproofing material applied to the exposed surface of the board and designed to simulate a masonry construction with mortar bars therebetween, the opposite face coated with asphalt and impressed grooves in the asphalt coated board surface, said grooves substantially in line with said mortar bars on the exposed surface.

2. A building unit comprising a fiber board, opposite faces of the board surface impregnated with waterproofing compound, one face having applied thereto weatherproofing material, and designed to simulate masonry construction with mortar bars therebetween, impressed grooves in the opposite face of the board substantially in line with the mortar bars, said grooves having walls thereof surface impregnated with asphalt.

3. A building unit comprising a vegetable fiber board with one surface shaped to simulate at least two rows of bricks with mortar bars therebetween, the masonry simulating surface weatherproofed, the opposite surface impregnated with waterproofing material and said opposite waterproofed surface having impressed grooves therein, said impressed grooves substantially in line with the mortar bars.

4. A building unit comprising a fiber board with one surface weatherproofed and the weatherproofing designed to simulate rows of bricks with mortar bars therebetween, the opposite face surface impregnated with waterproofing material, said waterproofed surface having impressed grooves substantially in line with the mortar bars and said last mentioned surface having a smooth and glossy surface acting as a vapor barrier.

5. The combination set forth in claim 1, the asphalt coating on said opposite face being deeper along said grooves than elsewhere whereby said unit is given added strength and rigidity and tight gripping nailing portions are provided.

6. The combination set forth in claim 2, the impregnation under said grooves being deeper than normal for the rest of the unit whereby said unit is given added strength and rigidity and tight gripping nailing portions are provided.

7. A building unit comprising a fiber board adapted to be secured to a building wall, the faces of said board being coated with a waterproofing compound such as asphalt, said coating impregnating said board to a limited depth, localized portions of said board being depressed, the depth of impregnation of said coating in said board immediately adjacent said depressions being greater than said limited depth normal for the remainder of the board whereby tight gripping nail holding means are provided.

8. A building unit comprising a fiber board, a face of said board being coated with a waterproofing compound of such character that it stiffens and cements said fibers together, but normally penetrates only to a relatively limited depth, portions of said board having a penetration by said compound to a substantially greater depth than the remainder, whereby tight gripping nail holding means are provided.

9. A building unit comprising a fiber board, a face of said board being coated with a waterproofing compound such as asphalt, said coating normally impregnating said board to a limited depth, limited areas of said board having an impregnation by said coating to a depth substantially greater than the remainder, whereby nail holding means are provided.

10. A rigid composition board formed of compacted fibrous material having at least one surface portion shallowly impregnated with waterproofing material, said board having a small portion thereof impregnated with waterproofing material to a much greater depth to uniformly harden the board throughout said portion and accommodate nailing thereof without materially reducing the insulation value of the board as a whole and without substantially altering the continuity of the fibrous material.

ROBERT LEE KAYE.